UNITED STATES PATENT OFFICE.

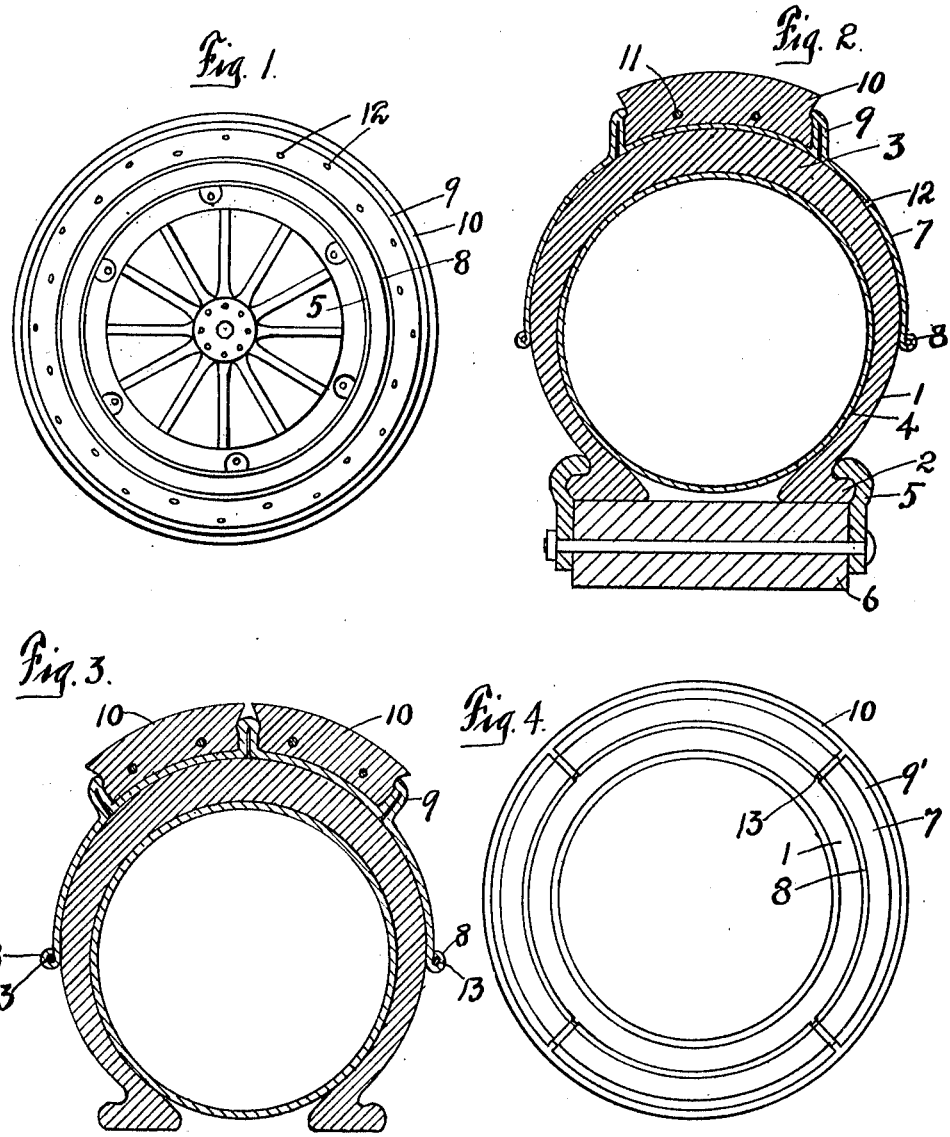
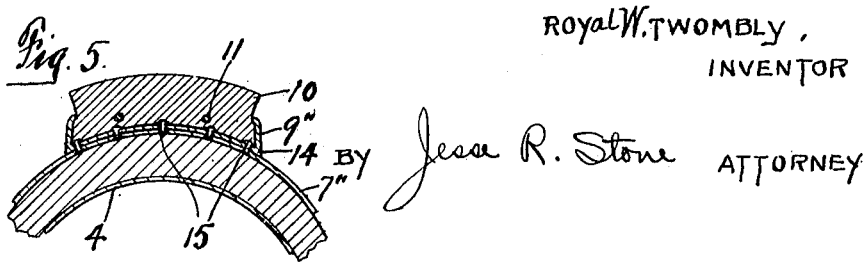

ROYAL W. TWOMBLY, OF FREEPORT, TEXAS.

TREAD FOR PNEUMATIC TIRES.

1,317,185.  Specification of Letters Patent.  Patented Sept. 30, 1919.

Application filed August 30, 1918. Serial No. 252,105.

*To all whom it may concern:*

Be it known that I, ROYAL W. TWOMBLY, a citizen of the United States, residing at Freeport, Brazoria county, Texas, have invented a certain new and useful Tread for Pneumatic Tires, of which the following is a full, clear, and exact description, such as will enable others skilled in the art to which it appertains to make and use the same.

My invention relates to an improvement in treads for pneumatic tires and has for its object the provision of means to prevent excessive wear or puncture of the parts of the tire constituting the tread portion.

A further object is to provide a protective covering for the tread portion of the tire which will be resilient and not easily penetrated by contact with sharp substances such as glass, nails, etc., and yet will present all the advantages of the unprotected pneumatic tire.

Another object is to provide a protective covering for a pneumatic tire which may be easily and quickly adjusted to the tire when desired.

Further objects and advantages will appear from the description which follows and will be set forth with more particularity in the claims.

Referring to the drawing forming a part of this specification and wherein like numerals are applied to like parts throughout the several views, Figure 1 is a side elevation of an automobile wheel showing one embodiment of my invention. Fig. 2 is a transverse section through an automobile tire and wheel rim showing my invention applied thereto. Fig. 3 is a similar view showing a similar modified form of my invention. Fig. 4 is a side elevation of an automobile tire to which a modified form of my invention has been applied, and Fig. 5 is a broken transverse section of an automobile tire showing a still further modification.

A common difficulty experienced with pneumatic tires for motor vehicles, is that an inflated rubber tire is subject to puncture or excessive wear, leading to the necessary loss of time, incident to repairing the same in order that it may be again inflated for use.

In my invention, it is contemplated to cover the outer tread portion of the tire with a metallic covering in order to prevent puncture or wear directly upon the tire and to place outside this metallic covering an auxiliary band or tire of rubber or other elastic material serving to act as a cushion therefor.

In Fig. 2, I have shown my invention applied to a pneumatic tire comprising an outer casing, 1, having an inner hooked portion, 2, of the ordinary clencher type. The outer tread side of the tire is thickened, as at 3, in the usual manner. The tire is shown as mounted in operative portion of a wheel rim, 6; the hooked portion, 2, of the tire being received and held by a coöperating clamp, 5, of the rim. My improved covering, 7, comprises a hoop-shaped casing or sheath adapted to fit closely around the outer periphery of the tire casing, 1. The covering is made of a hard or resilient substance, preferably of a metal such as steel. This sheath conforms in shape to the outer contour of the tire, the two side edges 8, thereof being recurved to form a marginal bead, which when the tire is inflated will act to grip the covering resiliently upon the tire. On each side of the median line of the said cover, I contemplate forming an outwardly extending flange, 9, for the purpose of clenching therebetween a pad or tire, 10, of rubber or other similar material. This outer tire is reinforced and held in position ordinarily by means of wires, 11, of ordinary construction. Along each side of the metal covering, 7, I may provide openings 12 for the purpose of releasing any dust or foreign material which might get under the covering and between the same and the tire. In Fig. 2, I have shown one outer tire or pad 10, to form a resilient or elastic tread for the protective covering, but it is obvious that two or more of these cushion tires may be used as is common with solid rubber tires, ordinarily used on motor vehicles, such as trucks. In Fig. 3, I have shown my invention modified to include two of these cushion pads, such pads being held as before between parallel radial flanges upon the protective covering.

While it is possible to form my protective covering of one continuous hoop of material, as is illustrated in Fig. 1, it will be preferable for some purposes to divide the said covering transversely at one or more points, thus allowing some slight play between the parts thereof. In Fig. 4, I have shown my covering divided into 4 such parts. These sections composing the covering in this modification fit somewhat closely together at the ends and the marginal bead, 8, is recurved in such manner as to form a channel therein through which I contemplate passing a cable, 13, or other reinforcing means for the purpose of more securely holding the parts of the covering attached to the tire. Under ordinary circumstances the resiliency of the covering will itself serve to clamp the same to the tire, but the reinforcing cable, 13, will serve to more firmly retain the same in position. It is obvious that this cable, 13, may have a snap or catch by means of which the same may be held detachably in position; or a turn-buckle, not shown, may be used to adjust the tension thereon, as desired. In this modification, I contemplate using the outer pad or tire, 10, of the same endless form as shown in Fig. 1, but I do not wish to confine myself to this form entirely, as in some cases it may be advantageous to form this part also in sections.

In Figs. 2 and 3, I have contemplated forming the clenching flanges, 9, by bending the covering itself outwardly and then back upon itself, but it is obvious that if the covering is made of material not properly adapted therefor that this construction will result in a spreading of the material of the flanges and will therefore be objectionable. If material of this character is used, it is preferred that the clenching flanges be made of more rigid material. In Fig. 5, I have shown the flanges, 9'' as being formed upon a separate detachable plate, 14, arranging to be attached to the covering 7'' by means of rivets, 15, or other similar means.

It is apparent in this modification that if the clenching means becomes injured or unserviceable the plate 14 with the flanges thereto attached may be detached from the covering, and a new plate, 14, substituted therefor.

In the operation of my invention, the protective covering is placed upon the tire casing when the same is deflated and it is apparent that in this condition of the tire the same may be compressed to such an extent that the covering may be sprung around the same and fitted in proper position. When this has been done, the tire may be again inflated and the resiliency of the covering will serve to hold the said covering firmly in position.

When the covering is made in sections as is illustrated in Fig. 4, the cables 13 may be removed by detaching the same, and the parts may be placed upon the tire without deflating the same and may be secured in position by again snapping the ends of the cables, 13, in adjusted position. The sections making up the covering are held together by the flexible tread portion 10 and when the cable is removed the sections may be easily turned laterally so as to be easily slipped over the tire casing. It will be obvious that there will be a slight resistance in the continuous tread portion and that when the said sections are turned so as to include the casing, very little force will be necessary to adjust the coverings upon the casing of the tire. The snapping of the cables in position after the covering is thus adjusted will firmly secure the same in place.

In the use of this covering the tire will be protected against puncture from glass or nails or other sharp substances in the roadway and the outer cushion or tire, 10, will serve to take up any shock due to ordinary pebbles or other irregularity in the road bed. Any other shock of later proportions will be taken up in the usual way by the resiliency of the pneumatic tire itself. I have thus provided a protective covering for pneumatic tires which will greatly increase and prolong the life of the said tire.

The wear upon the tread portion of the tire will be taken up almost entirely by the outer pad or tire 10. Said outer tire may be easily detached and replaced when worn. It will be readily seen that a set of ordinary tires will last several times as long with this covering as they would without the same.

Having thus described my invention, what I claim as new, and desire to protect by Letters Patent is:

1. In a device of the character described, the combination of a pneumatic tire, a casing thereon, a protecting armor and tread therefor comprising a metallic covering approximately semicircular in cross-section and made up of a plurality of sections, beaded on the outer margins, an adjustable fastening means adapted to be passed through the said beads and an endless outer central rubber tread on said armor, secured in place by clamping flanges thereon, said fastening means and said tread acting to secure said armor on said casing.

2. In a device of the character described, a pneumatic tire, a protecting armor therefor comprising a resilient metallic covering composed of a plurality of sections, and a central solid rubber tread extending continuously around said armor, said armor being retained on said tire by said central tread and by an adjustable connecting means.

In testimony whereof, I hereunto affix my signature this the 22nd day of August, 1918.

ROYAL W. TWOMBLY.